(12) United States Patent
Metzger et al.

(10) Patent No.: US 10,567,393 B2
(45) Date of Patent: Feb. 18, 2020

(54) DISTRIBUTED BLOCKCHAIN DATA MANAGEMENT IN A SATELLITE ENVIRONMENT

(71) Applicant: Vector Launch Inc., Tucson, AZ (US)

(72) Inventors: John Metzger, Campbell, CA (US); Shaun Coleman, San Jose, CA (US)

(73) Assignee: Vector Launch Inc., Tucson, AZ (US)

( * ) Notice: Subject to any disclaimer, the term of this patent is extended or adjusted under 35 U.S.C. 154(b) by 43 days.

(21) Appl. No.: 15/923,531

(22) Filed: Mar. 16, 2018

(65) Prior Publication Data

US 2019/0289018 A1 Sep. 19, 2019

(51) Int. Cl.
*H04L 29/06* (2006.01)
*B64G 1/10* (2006.01)
*G06F 16/23* (2019.01)

(52) U.S. Cl.
CPC .............. *H04L 63/123* (2013.01); *B64G 1/10* (2013.01); *G06F 16/2365* (2019.01)

(58) Field of Classification Search
None
See application file for complete search history.

(56) References Cited

U.S. PATENT DOCUMENTS

| 6,178,163 B1* | 1/2001 | Yuan | H04B 7/18584 |
| | | | 370/323 |
| 9,819,742 B1 | 11/2017 | Coleman et al. | |
| 2009/0320102 A1* | 12/2009 | Ou | H04L 51/38 |
| | | | 726/4 |
| 2015/0339867 A1 | 11/2015 | Amon | |
| 2016/0275461 A1 | 9/2016 | Sprague et al. | |
| 2016/0321654 A1 | 11/2016 | Lesavich et al. | |
| 2017/0031676 A1 | 2/2017 | Cecchetti et al. | |
| 2017/0034250 A1* | 2/2017 | Sobhani | H04B 7/18521 |
| 2017/0180134 A1* | 6/2017 | King | H04L 9/3247 |
| 2017/0289111 A1* | 10/2017 | Voell | H04L 63/0435 |
| 2017/0346693 A1* | 11/2017 | Dix | H04L 9/3247 |

FOREIGN PATENT DOCUMENTS

WO 2016/126888 A1 8/2016

OTHER PUBLICATIONS

International Application No. PCT/US2018/019474, International Search Report & Written Opinion, 10 pages, dated May 2, 2018.
International Application No. PCT/US2018/022981, International Search Report & Written Opinion, 9 pages, dated Jun. 8, 2018.
SpaceChain White Paper, "Space Exploration Program Based on Human Consensus," Version 1.0, 33 pages, Feb. 27, 2018.

* cited by examiner

Primary Examiner — Henry Tsang

(57) ABSTRACT

Systems, methods, and software described herein provide enhancements for managing data storage in a satellite platform. In one implementation, a satellite platform includes a plurality of satellites, wherein a first satellite of the platform is configured to identify a request for a ledger entry for a blockchain maintained by the satellite platform and, in response to the request, distribute the ledger entry to one or more other satellites of the satellite platform, wherein the one or more other satellites comprise full nodes for the blockchain. Once distributed, the one or more other satellites each determine whether the ledger entry is verified and, when the ledger entry is verified, enters the ledger entry in a ledger for the satellite.

17 Claims, 10 Drawing Sheets

DISTRIBUTED BLOCKCHAIN DATA MANAGEMENT IN A SATELLITE ENVIRONMENT

BACKGROUND

Satellites can be deployed into orbit to provide various space-based operations, such as military and civilian observation operations, communications operations, navigation operations, weather operations, and research operations. Satellites can include various sensors and communication equipment that are used to perform desired tasks. For example, a weather satellite may include one or more cameras or imaging sensors that can be used to take images of Earth, and communication equipment that can be used to communicate the images to a control system on Earth. Although satellites can be configured to perform these specialized operations, satellites are expensive to create and launch into orbit, especially for organizations that may not require the use of an entire satellite with a large number of sensors, or may not require continuous operations on the satellite. As a result, organizations may avoid the use of satellites, limiting the use of promising satellite technology.

OVERVIEW

The technology disclosed herein provides enhancements for managing data storage in a satellite platform. In one implementation, a satellite platform includes a plurality of satellites, wherein a first satellite of the platform is configured to identify a request for a ledger entry for a blockchain maintained by the satellite platform and, in response to the request, distribute the ledger entry to one or more other satellites of the satellite platform, wherein the one or more other satellites comprise full nodes for the blockchain. Once distributed, the one or more other satellites each determine whether the ledger entry is verified and, when the ledger entry is verified, enters the ledger entry in a ledger for the satellite.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
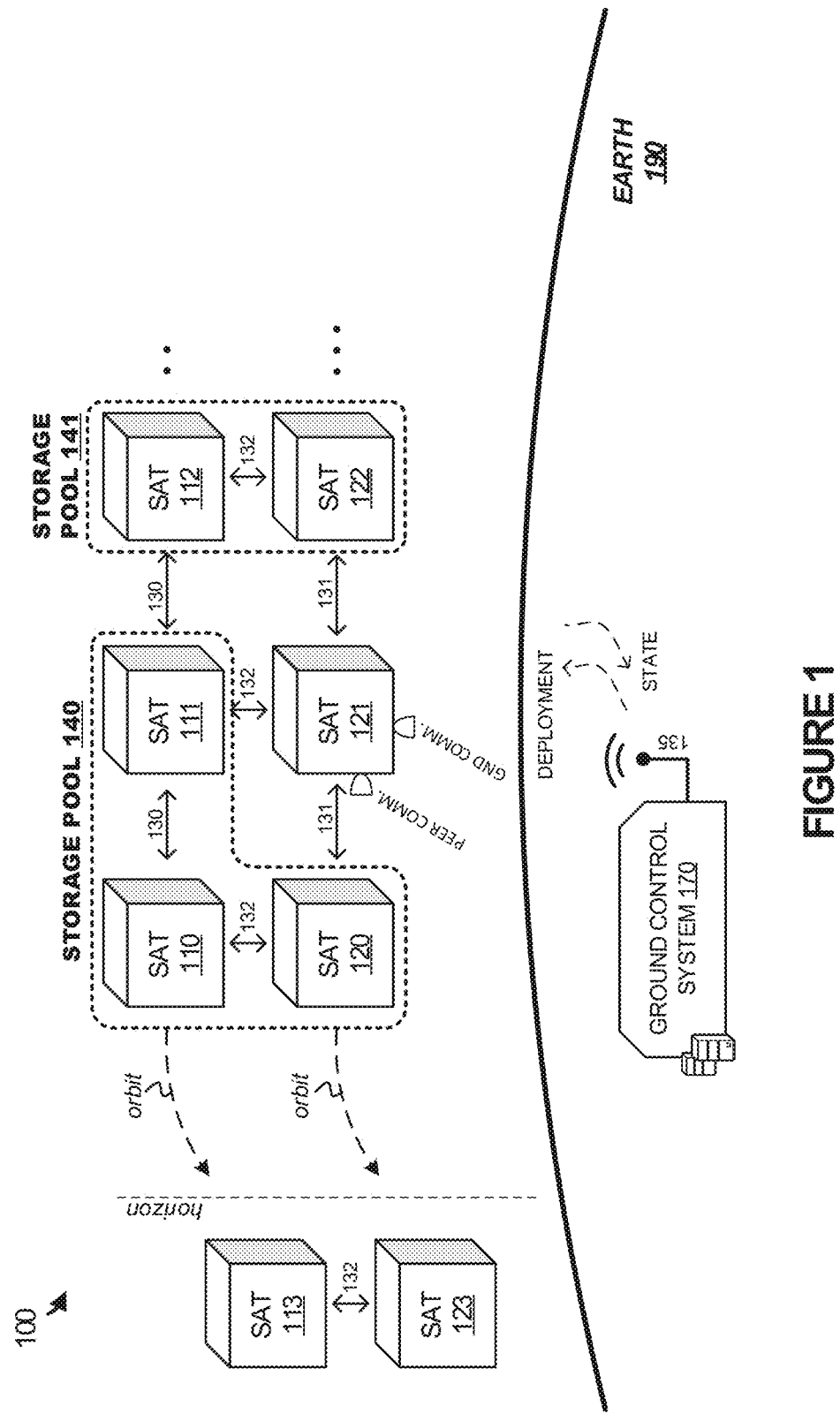
FIG. 1 illustrates a satellite environment according to an implementation.

The various examples disclosed herein provide enhancements for satellite hardware and software technology. For example, a cluster of satellite devices can be deployed into orbit using a launch system. These satellite devices can comprise general-purpose satellite devices, such as CubeSat devices configured with processing systems, storage systems, and communication systems. These satellite devices can also have specialized roles which can be defined according to provisioned hardware or software elements, or can be associated with a particular set of applications deployed to the associated satellites.

In some implementations, each of the satellites may operate one or more processes, wherein each of the processes may be part of a distributed application that can operate on two or more of the satellites in the platform. To provide the required operations to the processes, which may comprise virtual nodes such as virtual machines or containers in some examples, each of the satellites may be configured with a pooled data storage that can be shared between processes executing on multiple satellites. In particular, rather than limiting each of the processes to storage local to a satellite, a storage pool may be generated, permitting processes for an application across multiple satellites to share a common storage volume. This storage volume, which may comprise a virtual disk, virtual machines disk, or some other virtual volume, may be provided as a common storage area with aggregated storage to each of the process of the application. Once provided to the processes, the processes may store and retrieve data from the volume as required.

In some implementations, in storing the data to the volumes, each of the satellites may be configured with a storage management operation that identifies the one or more satellites required to store the data object and initiates a storage operation to store the data object (such as an image). In determining where to store the data object, the satellite may consider a variety of factors including, the satellite capable of processing the data object, the orbital location of satellite with respect to other satellites, a ground system, or some other geographic object of interest, the satellite with most storage available to store the data object, the proximity of the satellite in relation to a data processing satellite for the application, any latency in communicating between the satellites, throughput between the satellites, or some other similar information, including combinations thereof. In some examples, the data object may be stored on a single satellite, however, it should be understood that portions of the data object may be stored on different satellites, or the data object may be stored in multiple locations at any one instance.

In addition to providing operations for storing data objects for the processes on the satellites, the satellite may also include operations to retrieve data objects from the pooled storage. This retrieval operation may identify similar attributes to those provided above, and retrieve the object from the corresponding satellite. For example, when an object is requested, the object may be stored on multiple satellites. Consequently, the retrieval operation may identify the satellite with the best connection bandwidth, latency, physical distance, or some other similar information to retrieve the required data.

FIG. 1 illustrates a satellite environment 100 according to an implementation. Satellite environment 100 includes satellites 110-113, satellites 120-123, Earth 190, ground control system 170. Satellites 110-113 and satellites 120-123 communicate via wireless communication links 130-132. Ground control system 170 communicates with satellites 110-113 and satellites 120-123 using wireless communication link 135. Satellites 110-111 and 120 are part of storage pool 140 and satellites 112-122 are part of storage pool 141.

As described herein, a plurality of satellites 110-113 and 120-123 may be launched and deployed as an orbiting platform for various software applications. To generate the applications, a design platform may be provided as part of ground control system 170 that may include various tools and APIs that permit organizations to generate the required software applications. In some implementations, the design may provide users with selectable functions and interface elements that are available on each of the satellites. Using the functions and available interface elements, the developer or developers for a particular organization may generate a software application that performs desired operations. For example, a developer may generate an application that uses a camera on a satellite to track movements of relevant objects. Other operations of the applications may include military and civilian observation operations, communications operations, navigation operations, weather operations, and research operations.

Once the application is developed, and in some examples verified by the satellite platform provider, the application may be deployed to one or more satellites of the platform where the application may execute alongside one or more other applications. In some implementations, the applications in satellites 110-113 and 120-123, the applications may be configured to execute as virtual nodes, wherein the virtual nodes may comprise full operating system virtual machines and/or virtual containers. These containers may include Docker containers, Linux containers, jails, or another similar type of virtual containment node, which can provide an efficient management of resources from a host system. The resources used by the containers may include kernel resources from the host computing system and may further include repositories and other approved resources that can be shared with other containers or processes executing on the host. However, although resources may be shared between the containers on a host satellite device, the containers are provisioned to have private access to the operating system with their own identifier space, file system structure, and network interfaces.

In addition to the applications that execute as virtual nodes on the satellite, satellites 110-113 and 120-123 may also be configured with data storage capable of storing data for the applications executing thereon. Here, the data storage may be configured such that the storage across multiple satellites may be pooled (e.g. storage pool 140 and storage pool 141), such that data objects may be stored for one of the applications at any one of the satellites that belong to the pool. For example, an application may execute as a virtual node on satellite 110, and generate a data object that is required to be stored for future processing (e.g. an image taken using a camera on the satellite). Once the request is generated, a storage location for the object may be determined, and the data object transferred to the corresponding satellite for the storage location. Using the example above, when the data object is required to be stored, satellite 110 may communicate the data object to a second satellite, such as satellite 111, wherein the data object will be stored using local storage of the satellite. In this manner, although an application may provide multiple virtual nodes across multiple satellites, each of the virtual nodes may store and obtain data objects from a common volume that includes the pooled storage resources across the satellite platform.

In some implementations, in determining the storage location of the object, a process or operation executing on the satellite may be responsible for determining the satellite or satellites that should be used in storing the data. This operation, which may execute as part of or separate from the virtual nodes, may identify a request to store a data object and determine the one or more storage locations for the data object based on a variety of factors. This storage may include redundancy, efficiency in data processing, efficiency in data communication, orbital locations of the satellites, or some other similar factor, including combinations thereof. As an example, if satellite 110 required the storage of an image for later data processing, satellite 110 may make a determination of where to store the data object based on which of the satellites would be responsible for processing the data object. Thus, if satellite 110 were responsible for processing the data object, the data object may be maintained locally, however, if the data object were to be processed by a second satellite, then the object may be communicated to, and stored on, the identified satellite and/or a satellite in near communication proximity with the processing satellite.

Figure 2:
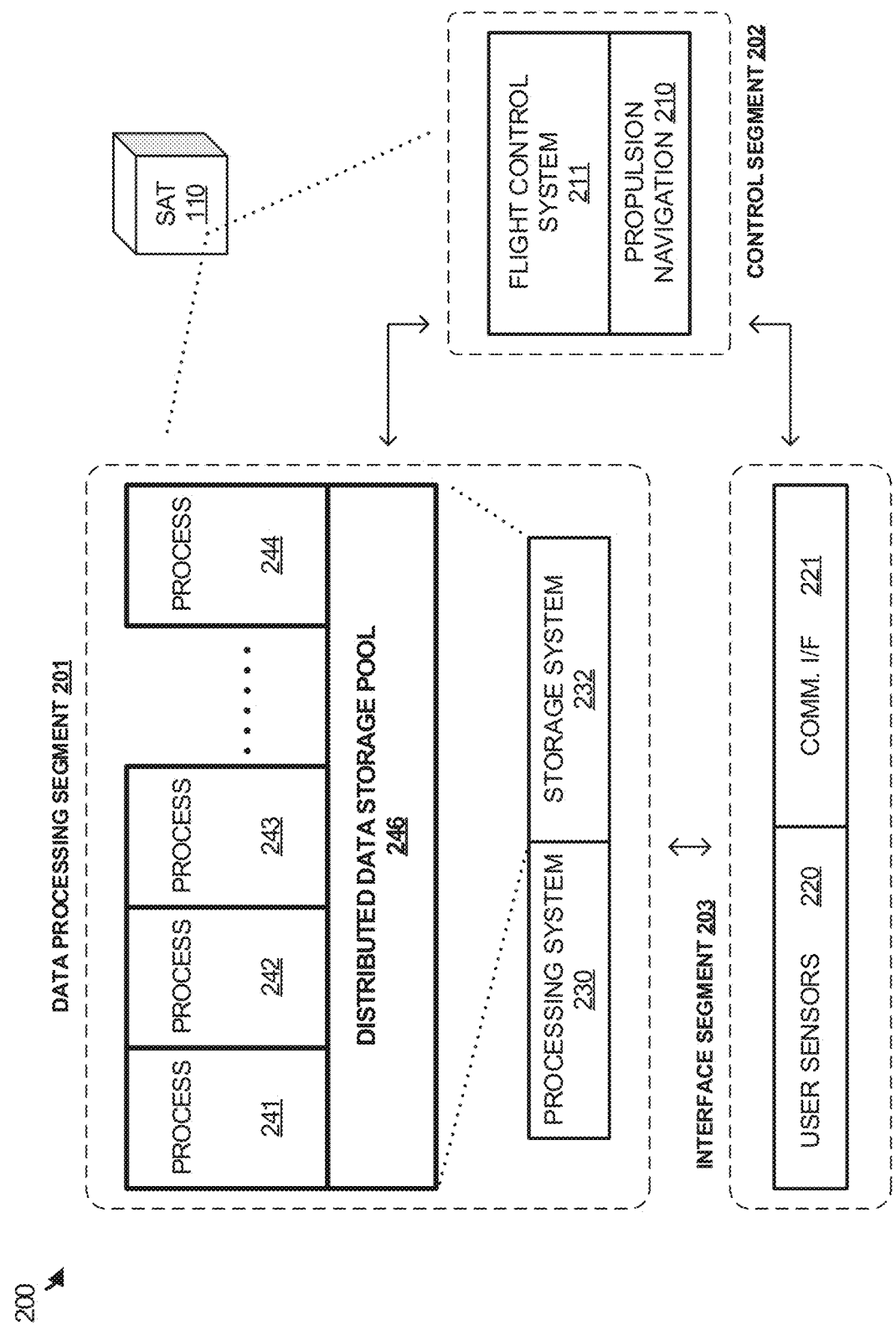
FIG. 2 illustrates an expanded view of a satellite capable providing a platform for a distributed satellite application according to an implementation.

FIG. 2 illustrates an expanded view 200 of a satellite capable providing a platform for a distributed satellite application according to an implementation. Satellite 110 includes data processing segment 201, control segment 202, and interface segment 203, which may be coupled using various communication links. Data processing segment 201 includes processing system 230 and storage system 232 to store processes 241-244, which may comprise virtual machines and/or containers, and distributed data storage pool 246. Control segment 202 further includes flight control system 211 and propulsion navigation 210. Interface segment 203 further includes user sensors 220 and communication interface 221, wherein communication interface 221 may be used for ground communication and inter-satellite communication. User sensors 220 may include imaging sensors, temperature sensors, light sensors, or some other similar sensor capable of interaction with processes 241-244.

As described herein, organizations may generate applications that are capable of being deployed as virtual nodes on one or more satellites of a satellite platform (illustrated as process 241-244 in FIG. 2). These applications may be provided from a ground control system, or may be provided from another satellite via communication interface 221 on satellite 110. Once the applications are provided, the satellite may provide a platform for the execution of the applications. Here, each application provided to satellite 110 is executed as a separate process in processes 241-244, wherein the processes may comprise full operating system virtual machines or containers capable of sharing resources from the underlying operating system in storage system 232.

To manage the execution of the virtual nodes, data processing segment 201 may maintain a schedule that is used to allocate processing resources of processing system 230 to each of the processes, user sensors 220 to each of the processes, and other similar resources on satellite 110. In particular, the schedule may be used to ensure that each application is scheduled to receive processing resources from processing system 230 during defined time periods, and receive access to user sensors 220 during defined time periods. In some implementations, one or more of the applications may execute during the same time period on satellite 110. These applications may use different sensors in user sensors 220, may time share the use of sensors in user sensors 220, or may use the same data from user sensors 220 in their operation. To allocate the sensors, satellite 110 may be responsible for providing each operating process with a communication link to the required user sensor, and deallocating or removing the communication link to the required sensor based on the scheduling. For example, an imaging device may be accessed by process 241 during a first-time period, wherein process 241 may access the sensor based on addressing information provided by operating system 235. Once the time period expires, operating system 235 may prevent process 241 from accessing the sensor, in some examples, by removing the addressing access of the process, and allocating access of the sensor to a second process.

In some implementations, when providing the platform for each of the processes, satellite 110 is further configured to maintain distributed data storage pool 246, wherein the local storage of satellite 110 may be combined with storage on other satellites to provide a platform for the applications on the satellite platform. This distributed data storage pool may permit each process of processes 241-244 to store data locally at satellite 110, as well as store data in storage locations on other satellites of the platform. For example, an application may be configured such that applications on specific satellites provide most of the processing on the data object. As a result, when a data object is generated, such as an image, the image may be stored in storage location of the storage pool that is near the data processing satellite or closer to the data processing satellite. Referring to an example in FIG. 1, when a process of processes 241-244 generates an image using user sensors 220, rather than storing the data locally in distributed data storage pool 246 on satellite 110, the process may transmit the image to a second satellite. This second satellite may include additional storage resources to store the image, may be a satellite that is configured to process the data, may be a satellite that is orbiting over an area of interest, or may be any other satellite configured as part of the distributed storage pool. Although demonstrated in the example of expanded view 200 as a single data storage pool, it should be understood that multiple storage pools may be configured across the satellites. For example, process 241 may be provided with a first distributed data storage pool across a subset of satellites, while process 242 is provided with a second data storage pool across a subset of satellites. These pools may include storage space on the same subset of satellites in the platform, or may comprise storage space on different subset of satellites based on the application deployment.

In some implementations, the storage pools for each of the processes may be provided as a mounted virtual volume or disk, wherein the processes may be unaware of the location of the data objects within the volume. Instead, when a storage request is identified from a process of the processes, the satellite may determine a storage location on the available satellites for the storage pool and initiate an operation to store the data on the appropriate satellite.

In addition to the data processing operations provided in data processing segment 201, satellite 110 further includes control segment 202. Control segment 202, which may be communicatively linked to data processing segment 201 and interface segment 203, is responsible for logistical control elements of the satellite of satellite 110. The operations may include managing the deployment of solar panels on the satellite, managing the positioning of the satellite with regards to the Earth or the sun, or any other similar operation. In at least one example, flight control system 111 may monitor for requests from the operating system, and determine whether the satellite is capable of accommodating the request from the operating system. For example, process 241 may generate a request to move a user sensor, which also requires movement using propulsion and navigation 210. In response to the request, flight control system 211 may determine that the movement cannot be made, and may prevent the movement of the satellite using propulsion and navigation 210. Further, in some implementations, flight control system 211, may provide a notification to the operating system and process 241 indicating that the movement is not permitted.

Although illustrated as a separate system in the example of FIG. 2, it should be understood that in some examples, flight control system may be implemented and stored on processing system 230 and storage system 232. However, it should also be understood that flight control system may be stored on a separate storage system and use a different processing system than operating system 235 and its corresponding virtual nodes.

While demonstrated in the example of FIG. 2 with the processes (virtual machines or containers) located outside of the pooled storage, it should be understood that the processes may also be stored with the pooled storage. In this manner, a process, such as a container, may be stored on one or more satellites, and executed on other satellites. For example, while process 241 may be stored on satellite 110, the process may be executed locally on satellite 110, and may further be executed by satellites 111 and/or 120 that belong to the same storage pool. Similarly, any operating system or supportive software operations of the satellites may be stored within the storage pool and provided to other satellites as required. Thus, rather than requiring data to be stored on each of the individual satellites, a satellite may request and receive data from a second satellite in the pool to perform the required operations.

In some implementations, in storing data within distributed data storage pool 246, satellite 110 may be configured to maintain snapshots and/or state information for each of the processes. This state information may include current operations of each of the processes, items of interest identified by each of the processes, or some other similar information. Because the state information is stored in the storage pool, and not necessarily local to satellite 110, if a failure were to occur with the satellite, the state information may be used to implement the operations on another satellite or reconfigure satellite 110 using the state information. As a result, if satellite 110 provided its state information to satellite 111, then the state information may be used to reconfigure any of satellites 110-111 or 120 based on the state information to provide the required operations.

Figure 3:
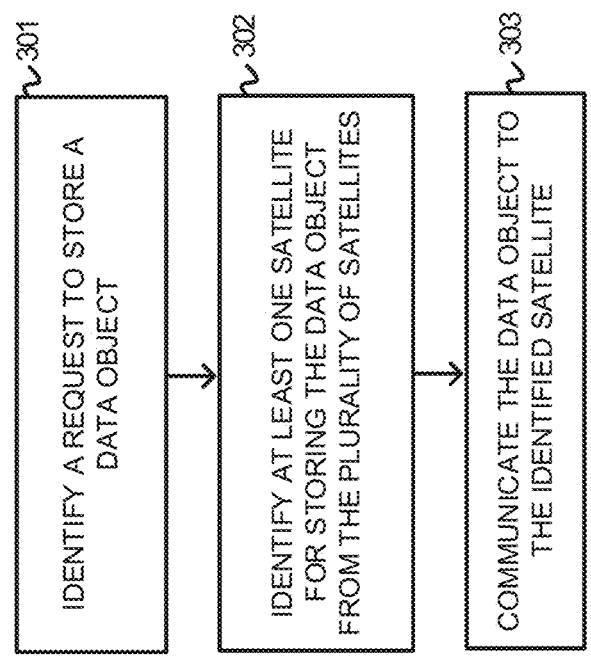
FIG. 3 illustrates an operation of a satellite to manage the storage of data objects according to an implementation.

FIG. 3 illustrates an operation 300 of satellite 110 to manage the storage of data objects according to an implementation. The processes of operation 300 are described parenthetically in the paragraphs that follow with reference to systems and elements of satellite environment 100 of FIG. 1 and expanded view 200 of FIG. 2

As depicted, operation 300 on satellite 110 identifies (301) a request to store a data object. In some implementations, in identifying the storage request, a process in processes 241-244 may, as a result of its operation, generate a request to store a data object. For example, process 241 may use an image sensor in user sensors 220 to take images of geographic areas of interest. As the images are generated, operation 200 will identify (302) at least one satellite for storing the data object from the plurality of satellites. In storing the data object, as depicted in expanded view 200 of satellite 110, the satellite may include a distributed data storage pool that permits processes on the satellite to store data objects across a plurality of satellites. In determining the storage location for the particular object in the storage pool, operation 300 may be configured to consider various factors to identify the storage location within the storage pool. These factors may include processing that is required on the data object, the orbital location of each of the satellites, the type of data object, the size of the data object, or any other similar factor, including combinations thereof. Additionally, communication parameters and factors may be considered, including latency in communicating with each satellite in the storage pool, throughput to each satellite in the storage pool, or some other similar communication information, including combinations thereof.

In some implementations, a subset of satellites within the satellite platform may be used as storage locations for data objects from other satellites. In this manner, satellites may request and receive data objects from the "storage satellites" and perform the required processing using the data objects. In some examples, the data objects may be stored at a single location, however, it should be understood that duplicate versions of the data objects may be maintained for redundancy and/or faster access for the satellites that require access to the data objects. Using the example of satellite 110, satellite 110 may identify a storage location as both satellite 111 and 120, which are part of the same storage pool 140, to ensure that the application possess multiple options in accessing the data object. Thus, if a read is required of the data object, each of the satellites may determine the satellite with the most efficient path (latency, availability, throughput, and the like), and retrieve the object from the satellite corresponding to the most efficient path. Once the at least one satellite is determined for storing the data object, operation 300 communicates (303) the data object to the at least one identified satellite. Referring to the example, in expanded view 200, operation 300 may transmit via communication interface 221, the data object to the required satellites. In some implementations, the communication may be direct to another satellite in the platform, however, it should be understood that the communication may be delivered over one or more satellites to the required destination satellite for storing the data object.

In some examples, operation 300 may operate as part of processes 241-244. In other implementations, operation 200 may operate as part of the host platform (such as the operating system) for the processes. As a result, when a storage operation is required, the operation may determine a storage location for the object, and provide the object to the one or more appropriate satellites.

Although demonstrated in the example of operation 300 as storing a data object, it should be understood that similar operations may be provided when a data object is requested by a process on a satellite. In particular, in response to a request for a data object, the satellite may determine at least one satellite capable of servicing the request. In determining the at least one satellite to service the request, the satellite may determine latency in obtaining the data object, physical proximity to the satellites hosting the data object, or some other similar factor in determining the source of the data object. Once the at least one source satellite is determined for the data object, the satellite may request and receive the data object for processing. Thus, if process 241 on satellite 110 requested a data object, satellite 110 may determine satellites in the platform that store the data object, identify an appropriate source of the data object using the aforementioned factors, and obtain the data object for processing via process 241.

In some examples, when an application is deployed in the satellite platform, processes for the application may migrate between satellites to provide the proper operation. This migration may be used as a failover when a satellite fails, may be used to ensure contiguous operations over a particular region of interest, or may be provided for any other similar manner. To ensure that processes are capable of migration between satellites, the satellites may exchange and store state information from other satellites. Using the example of satellite environment 100, satellite 110 may distribute state data to one or more of satellites 111 and 120 to ensure that the required application process may be migrated between the satellites. This state data may include the current operation information for the process on satellite 110, any data gathered from sensors on satellite 110, or any other similar information for a process on satellite 110. In some implementations, exchanging the state data may include storing the data in a distributed manner, such that parity may be maintained between the satellites to rebuild or maintain data in event of a failure of one of the satellites. In other implementations, each of the satellites may act as a peer, wherein full or partial state data is provided to another satellite within the satellite platform.

Figure 4:
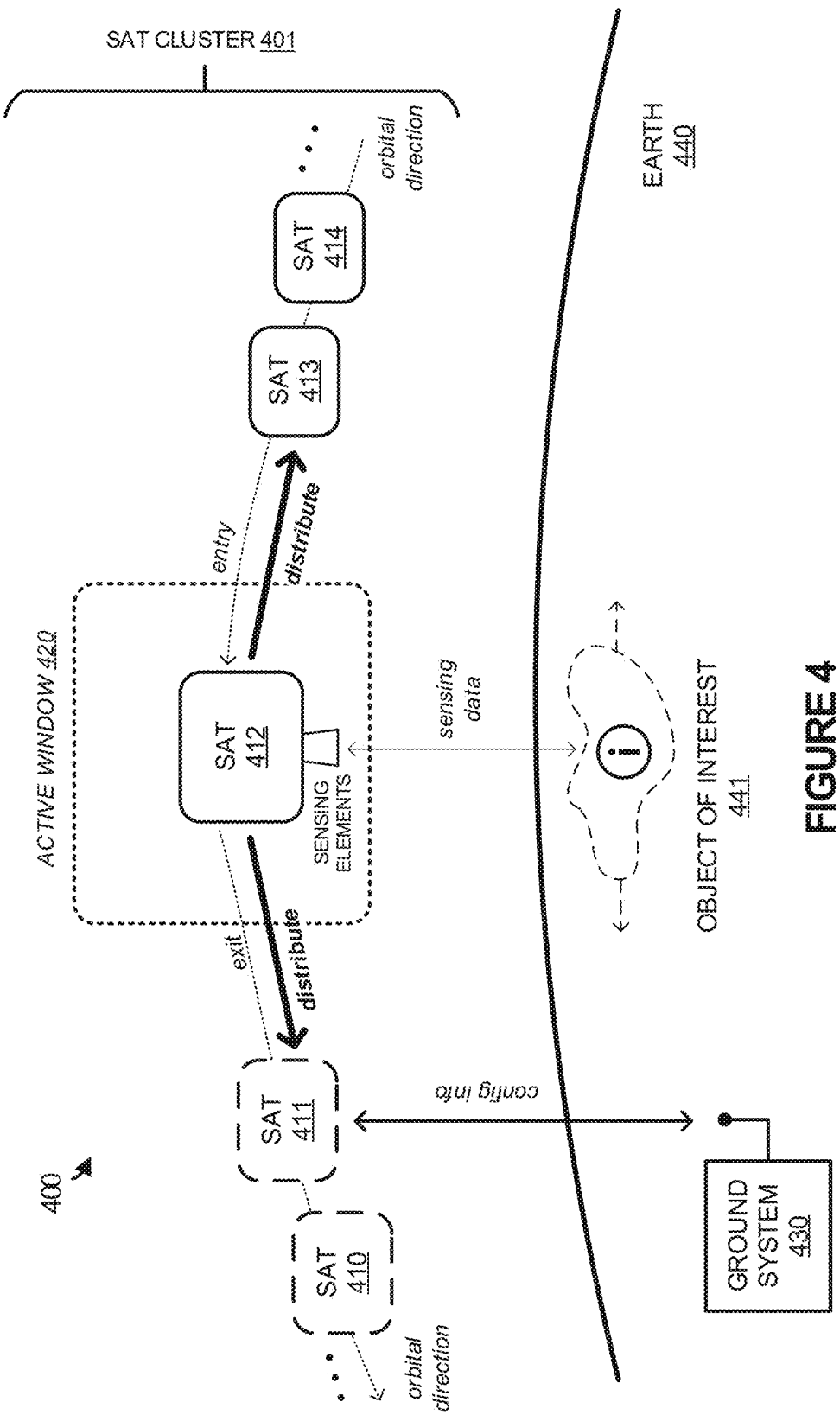
FIG. 4 illustrates an operational scenario of distributing data objects according to an implementation.

FIG. 4 illustrates an operational scenario 400 of distributing data objects according to an implementation. Operational scenario 400 includes satellites 410-414, ground system 430, object of interest 441, and Earth 440.

In operation, satellites 410-414 are deployed as a platform, wherein the satellites may be provided with one or more applications that provide various operations using sensors and communication interfaces of the satellites. These operations may include military and civilian observation operations, communications operations, navigation operations, weather operations, and research operations. In implementing the applications, ground system 430 may deploy the applications as virtual nodes across one or more of satellites 410-414. Once deployed, the virtual nodes may use the communication systems and sensors of the satellite to provide the desired operations.

In the present implementation, a virtual node executing on satellite 412 is configured to obtain information about object of interest 441. Object of interest 441 may comprise a vehicle (boat, truck, and like), a region of interest (city, factory, and the like), or some other similar object of interest. As the information is obtained, the virtual node on satellite 412 may require the storage of the data object for future processing regarding object of interest 441. In storing the data object, the virtual node may be provided with a virtual volume, wherein the virtual volume is mounted to the virtual node and includes a storage pool for storage resources across a plurality of satellites in the satellite environment. When an object is required to be stored to the pool, satellite 412 may be required to identify a satellite in the plurality of satellites for the storage pool that is configured to store the data object. This determination may be based on storage space available at each of the satellites, the node or nodes that are configured to process the data object, the orbital location of each of the satellites (e.g. satellites that may process object of interest 441 next, or may be closer to ground control system 430), communication information between the satellites (latency, throughput, availability, and the like), or some other similar information. In some implementations, satellite 412 may determine that the storage location in the storage pool is local to satellite 412 and may consequently initiate write operation to store the data object in local storage media.

However, as demonstrated in the present example, satellite 412 may distribute the data object to one or more other satellites for storage. In some implementations, the data object may be stored on multiple satellites so as to provide redundancy in the environment. In other implementations, portions of the data object may be stored at different satellites.

In some examples, the data that is distributed by satellite 412 to other satellites in the storage pool may comprise additional information than data related to the sensing elements. This additional data that can be stored in the storage pool may include state information related to the processes (virtual machines or containers) executing on the satellite, images of the virtual machines or containers themselves, or status information for any other process on the satellite (such as the host operating system and related support processes). In this manner, data may be located on a first satellite, but may be provided to one or more additional satellites for execution and processing. As a result, storage resources may be conserved as a single data object may be accessed by multiple satellites in the platform via inter-satellite communication.

Figure 5:
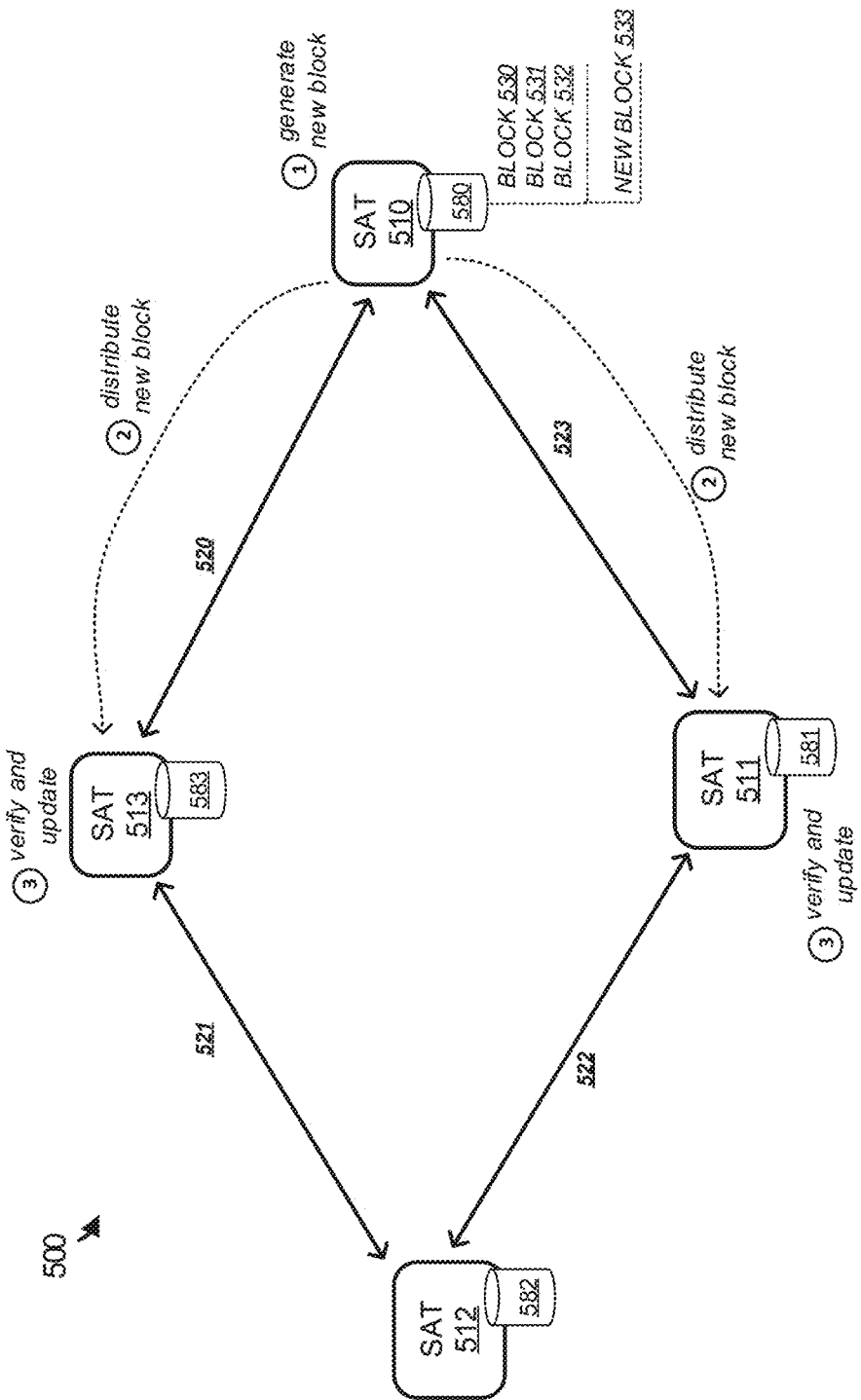
FIG. 5 illustrates an operational scenario of distributing blocks of a blockchain according to an implementation.

FIG. 5 illustrates an operational scenario 500 of distributing blocks of a blockchain according to an implementation. Operational scenario 500 includes satellites 510-513 with a peer-to-peer storage provided by data storage 580-583 at corresponding satellites 510-513. Satellites 510-513 further communicate via communication channels represented by links 520-523.

In the present implementation, one or more processes executing on each of satellites 510-513 are configured to manage a blockchain corresponding to blocks 530-533. A blockchain or block chain, is a continuously growing list of records, called blocks, which are linked and secured using cryptography. Each block in the chain typically contains a hash pointer as a link to a previous block, a time stamp, and transaction data. This transaction data may include one or more monetary transactions, property record information, medical record information, object movement information, or some other similar transaction information that may be kept in what is known as a ledger. Each ledger entry within the ledger may identify a type of item, a quantity of an item (e.g. coin value), a source of the item for transfer, a destination for the item for transfer, or some other similar information, including combinations thereof. For example, in cryptocurrency, a ledger entry may include a quantity of currency, a source of the currency transfer, a destination of the currency transfer, and a signature (further described below and associated with the source of the transfer). Once the ledger reaches a defined size, been maintained for a defined time period, or any other similar time instance, a new block may be created by one of satellites 510-513.

In some implementations, in generating a new block each satellite in satellites 510-513 may be configured to generate a hash for the next block in the blockchain. A hash, which is generated by what is known as a hash function, is any function that can be used to map data of arbitrary size to a fixed data size. For example, even if the ledger and the previous hash of block 532 were a gigabyte in size, the hash function may be used to generate an arbitrary number of values (such as 256 bits). In some implementations, when the ledger is to be entered as a block, satellite 510 may enter the required data of the ledger, the hash of the previous block, and what is called a "nonce" to determine the hash for the next block. This nonce may be used as a security measure to ensure that the block is valid for the blockchain.

Referring to the example in FIG. 5, after block 532 is added to the blockchain, and the generation of new block 533 is required, at step 1, satellite 510 (as well as satellites 511-513) will attempt to generate a new block for the chain. In generating the new block, satellite 510 will use at least the data for the block (the ledger), the hash from the previous block (hash for block 532), and a nonce (randomly selected by satellite 510) to generate a hash with defined characteristics for new block 533. For example, satellite 510 may apply random nonce values until the resulting hash includes the defined characteristics (e.g. first five bits of the hash include zeros). Once the hash includes the created values, the block may be distributed, at step 2, to other satellites of the satellite platform that provide storage for the blockchain (peer nodes of the blockchain). After being received by the peer node satellites that store instances of the blockchain, the satellites may verify, at step 3, the newly generated block and if verified, add the block to the local version of the blockchain. After being added, each of the satellites may continue maintaining their local ledger and attempt to add the next block of the blockchain for the application.

Although demonstrated in the example of FIG. 5 as providing the new block to satellites 511 and 513 for storage in data storage 581 and 583, it should be understood that the new block may also be distributed to satellite 512. This distribution may occur via a direct link between satellite 510 and satellite 512 or may occur using satellites 511 and 513 or another satellite (not illustrated).

In some implementations, the blockchains provided by the satellite environment may include information identified via sensors at the satellites, such as the movement of data objects detected via imaging sensors of the satellites. However, it should be understood that the ledger data may include information obtained from one or more ground systems, such as monetary exchanges, property exchanges and the like. Once provided from the ground system, the data may be distributed such that each node in the environment may maintain their own ledger.

In some examples, when an application is deployed in the satellite platform, processes for the application may migrate between satellites to provide the proper operation. This migration may be used as a failover when a satellite fails, may be used to ensure contiguous operations over a particular region of interest, or may be provided for any other similar manner. To ensure that processes are capable of migration between satellites, the satellites may exchange and store state information from other satellites. For example, using a blockchain, full nodes of the block chain (implemented by processes executed on satellites), may be required to be migrated for various different reasons. These reasons may include adding a node to the blockchain, resulting in the application being distributed to another satellite, providing a failover operation for one of the nodes, or some other similar migration operation. Consequently, state information may be distributed between satellites to ensure that the operations of the node are capable of migration (e.g. the application code for implementing the blockchain operations). Moreover, inherent in the configuration of blockchains, each new node may obtain the blockchain from other nodes (peers) within the satellite platform to maintain a local copy of the blockchain.

Figure 6:
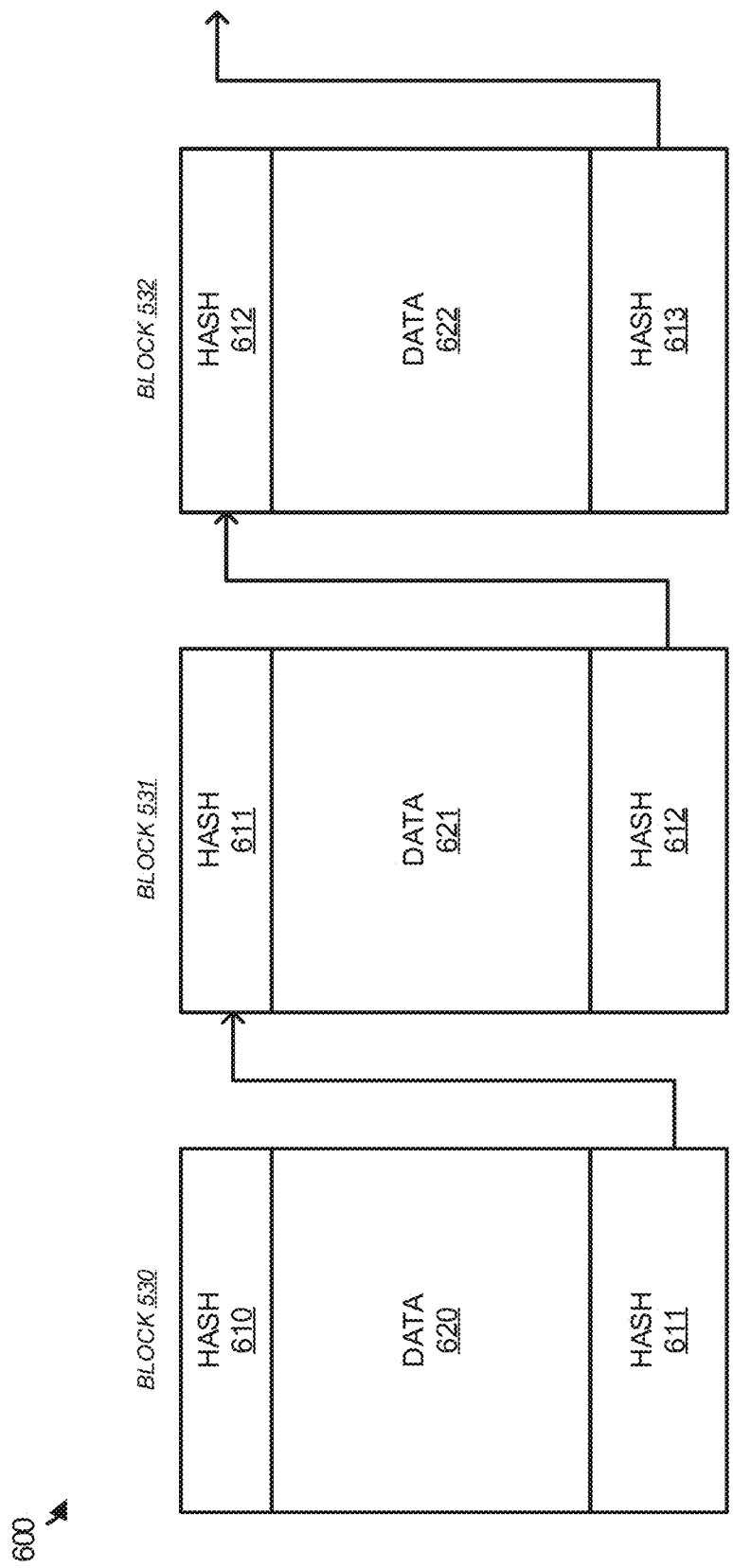
FIG. 6 illustrates a blockchain according to an implementation.

FIG. 6 illustrates a blockchain 600 according to an implementation. Blockchain 600 include blocks 530-532 from FIG. 5, wherein the blocks include hashes 610-613, and data 620-622.

As described previously with respect to FIG. 5, blockchains are a continuously growing list of records, called blocks, which are linked and secured using cryptography. In the present implementation, blocks 530-532 are linked via hashes 611-612, wherein block 531 includes the hash for previous block 530 and block 532 includes the previous hash for block 531. In generating each of the blocks, satellites that provide a platform for a particular application may each maintain ledger data that corresponds to monetary transactions, health care information, property transfer information, object movement information, or some other similar type of ledger information. This information may be obtained via sensors on the satellite or via communication systems from to a ground system or other satellites in the environment. As an example, if a new entry is required for a ledger, an entry may be signed by the generating party (satellite, ground system, and the like), and the entry may be added to the ledger while also being distributed to other satellites in the platform. As the ledger is maintained by each of the satellites, a block generation event may occur, wherein each of the satellites may attempt to generate the hash for the next block. This event may occur when the ledger reaches a particular length, when the ledger has been maintained for a particular time period, immediately after the generation of the previous block, or at any other instance. For example, each satellite may maintain the ledger data corresponding to data 622, and identify that a new block 532 is required to be generated for the blockchain. Once identified, each of the satellites will attempt to determine hash 613 that is required to be generated for the next block in the chain. Once the hash is generated, often by including a nonce within data 622 (a random set of bits) that generates particular characteristics in the hash, the block is added to the chain, and communicated to other satellites acting as nodes for the blockchain. Each of the receiving satellite nodes may then determine whether the new block is valid and, if valid, add the block to their local blockchain. In this manner the blockchain may permit a distributed storage of data across the satellite platform.

Figure 7:
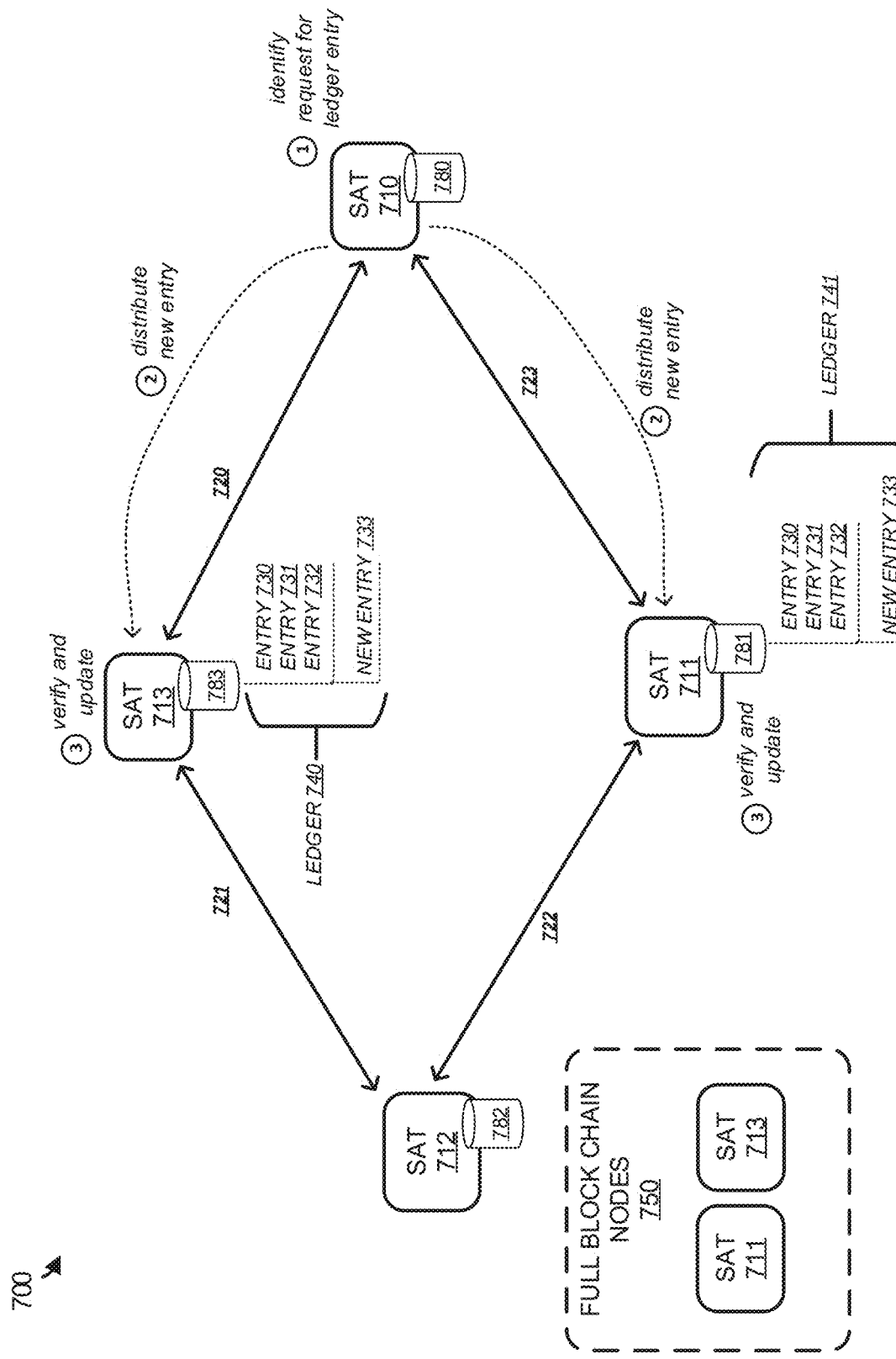
FIG. 7 illustrates an operational scenario of distributing a ledger entry for a blockchain maintained in a satellite platform according to an implementation.

FIG. 7 illustrates an operational scenario 700 of distributing a ledger entry for a blockchain maintained in a satellite platform according to an implementation. Operational scenario 700 includes satellites 710-713 with a peer-to-peer storage provided by data storage 780-783 at corresponding satellites 710-713. Data storage 781 and 783 is used to store ledger entries 730-733 that corresponds to a blockchain for an application executing via the satellite platform. Satellites 710-713 further communicate via communication channels represented by links 720-723.

As described herein, a satellite platform may be capable of maintaining a blockchain for a variety of purposes, such as financial transactions, sensor data, or some other similar purpose. In maintaining the blockchain, satellites of the satellite platform may be configured to provide full nodes, which store information for each of the blocks of the blockchain, while partial nodes or clients may store a portion of the blockchain that are relevant to the particular client node. Here, satellites 711 and 713 of the satellite platform provide full blockchain nodes 750 that are used to maintain full copies of the blockchain for an application executing across a subset of satellites 710-713.

Using the example in operational scenario 700, satellite 710 identifies a request for a ledger entry, at step 1. In identifying the request, a process (corresponding to the blockchain application executing across the subset of satellites) may identify the ledger entry based on sensor data for the satellite, based on a ground communication, or based on some other interaction. For example, a sensor may identify movement of a particular object (using a camera or some other sensor) and generate an entry based on the movement of the object. This entry may include information about the movement of the object (first location, destination, size, and the like), as well as a signature that corresponds to the particular application, the particular satellite, or some other similar signature. In other implementations, a ground communication system may provide and satellite 710 may receive a financial, land, or some other similar transaction as an entry for the ledger supported via the satellite platform. These ledger entries may include a transaction value (or land identifier), a source of the transaction, a destination of the transaction, or some other similar information for the transaction, as well as a signature providing approval for the transaction. Once received or identified, satellite 710 may distribute, at step 2, the entry to satellites 711-713 to update the ledger located on each of the corresponding nodes. Referring to the example of satellite 711, when the entry is received by satellite 711, satellite 711 may verify, at step 3, the entry and update the ledger that is stored locally at satellite 711. In verifying the entry, satellite 711 may check a variety of information with the entry including the signature that is associated with the entry. This signature, which is generated using a private key, may be associated with the satellite that generated the entry, a ground control system or user system that generated the entry, or some other similar signature identifying the source of the entry. This signature information may then be verified using a public key associated with generated the entry. For example, a user corresponding to a ground system may generate a request for a financial transaction. After generating the request, the ground system may transfer the transaction as a ledger entry to the satellite platform, wherein full blockchain nodes 750 may be used to verify the entry for a ledger associated with the transaction. Once verified, the entry may be added to the corresponding ledger of ledgers 740-741 (demonstrated in FIG. 7 as new entry 733). In contrast, if the entry does not meet the verification process of the satellites 711 and 713, then the entry will not be entered into the ledger.

As the ledger is maintained using ledger entries 730-733, each of the satellites that provide the full blockchain nodes may be used to generate blocks. These blocks may be generated at periodic intervals, such as time and/or quantity of entries, may be generated based on the creation of nonce values to generate a particular hash value, or may be generated at any other similar time period. Once a block is generated, the satellite that generated the block may provide the block to other nodes providing the blockchain, permitting the other nodes to verify the block. To verify the block, in some examples, the satellites that provide the full nodes may be configured to each verify the block and determine that a majority of the nodes approve the newly generated block. If the block is not approved by the majority, then the block may be rejected, and the nodes may wait for the generation of another block to continue the blockchain.

Although demonstrated in the example of FIG. 7 using four satellites to provide the satellite platform, it should be understood that any number of satellites may provide the satellite platform. Additionally, as additional satellites are deployed, the satellites may be configured with a process for the distributed application to implement a node for the blockchain. Thus, the blockchain may have a dynamically sized peer groups as satellites are made available and satellites are removed from the platform. Further, while demonstrated as direct communications between the satellites, it should be understood that the communication of the ledger entries and/or the blocks of the blockchain may be required to be communicated over multiple satellites to be received at the desired destination. This communication may be based on the shortest path, the availability of satellites to provide the communication, or some other similar factor, including combinations thereof. Moreover, while demonstrated as an example, where a client satellite 710 identifies the ledger entry, it should be understood that satellite 710 maintain at least a portion of the block chain and store the ledger entry locally on satellite 710.

In some implementations, the processes for a particular blockchain application may only be executed on a subset of the satellites of the satellite platform. As a result, any satellites that do not run a process for the application may be used as forwarding systems to forward communications between satellites that execute processes for the application. For example, if satellite 710 received a ledger entry for an application that does not have a process to handle and/or store the ledger entry on satellite 710, then satellite 710 may be responsible for forwarding the communication to the appropriate satellite(s) that correspond to the application for processing.

Figure 8:
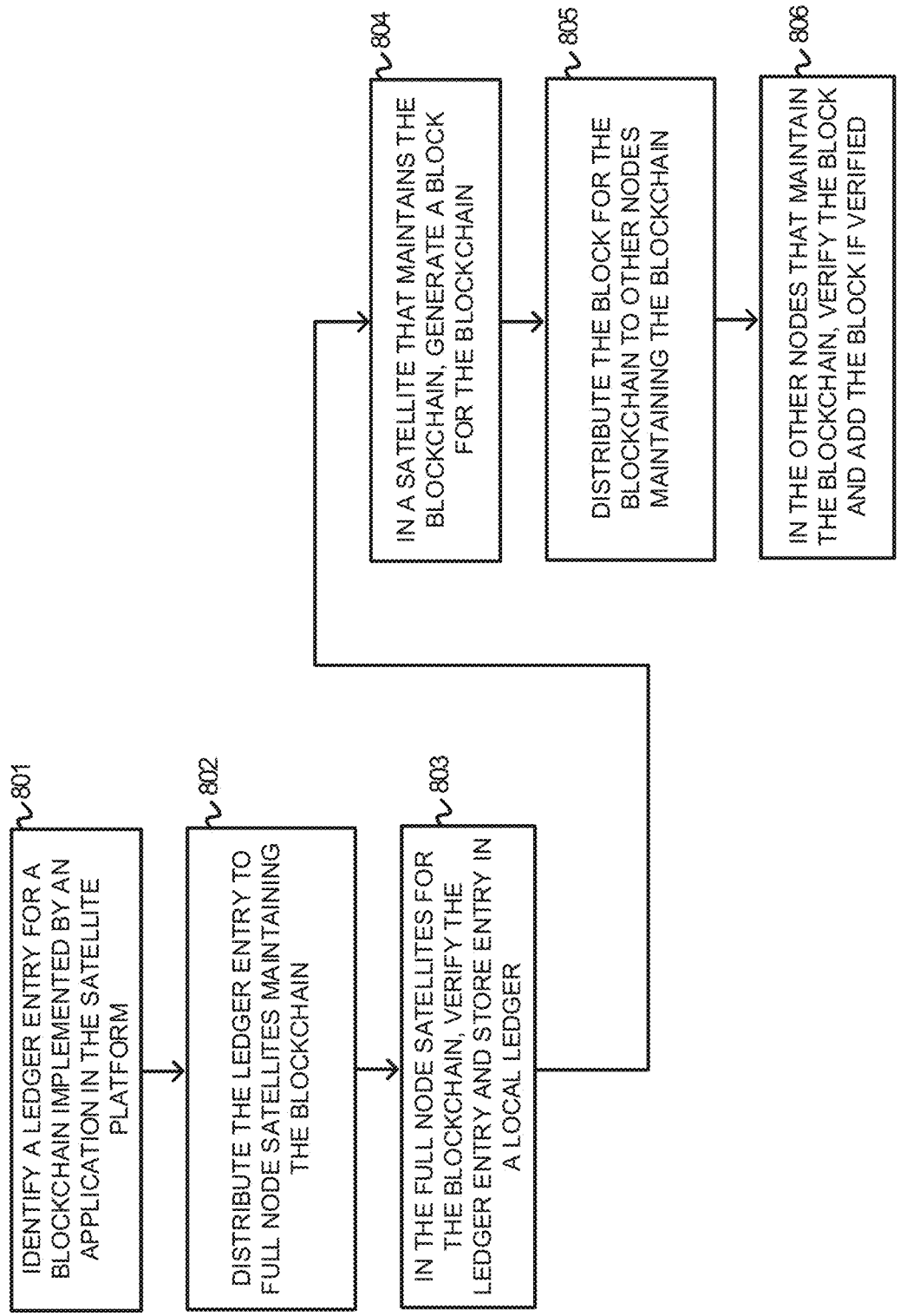
FIG. 8 illustrates an operation of a satellite platform to maintain a blockchain according to an implementation.

FIG. 8 illustrates an operation of a satellite platform to maintain a blockchain according to an implementation. The processes of FIG. 8 are described parenthetically in the paragraphs that follow with references to systems and elements of operational scenario 700 of FIG. 7.

As described herein, a satellite platform may be deployed that permits an application to be deployed as processes across multiple satellites. In some implementations, this application may be used to maintain a blockchain, which is a continuously growing list of records, called blocks, which are linked and secured using cryptography. In the present implementation, a satellite of the satellite platform identifies (801) a ledger entry for a blockchain implemented by an application of the satellite platform. This ledger entry may be generated via sensor data from the satellite itself, may be received from a ground system, or may be identified in any other similar manner. Once the ledger entry is identified, the satellite will distribute (802) the ledger entry to other satellites in the platform that provide a node for the blockchain (e.g. other satellites that provide a process for the application in the platform). Once received, each of the satellites that provide the nodes for the blockchain, may verify (803) the ledger entry and store the entry in a local ledger for the satellite when verified store the entry in a local ledger for the node. In verifying each ledger entry as it is received, the application process that provides the node may use a public key to verify the signature of the generated entry. This signature may correspond to a process identifier on one of the satellites (e.g. if a process on the satellite generated the entry) or may correspond to a user device or ground system device (e.g. when a user generates a ledger entry on the ground that is then communicated to the satellite platform). If the public key verifies the ledger entry that was created using a private key, then the ledger entry may be added to the local ledger on the satellite. In contrast, if the ledger entry is not verified using the public key then the entry may be prevented from being added to the ledger.

As an example, using FIG. 7, when satellite 713 obtains a ledger entry from satellite 710, a process on satellite 713 to implement the blockchain may apply a public key for the ledger entry to determine whether the entry is verified. If verified, satellite 713 may add the entry to ledger 740, however, if the entry is not verified, the ledger entry will not be added to the ledger.

While the ledger is maintained by satellites that provide nodes for the blockchain, a node may generate (804) a block for the blockchain. This block may be generated at a periodic interval, may be generated when the node generates a particular hash using nonce values and the ledger, or may be generated at some other interval. Once generated, the node will distribute (805) the block for the blockchain to other satellites acting as nodes for the blockchain. Once distributed, the other nodes that maintain the blockchain may verify (806) the block and add the block to a locally maintained version of the blockchain when verified. In verifying the block, the nodes that provide the blockchain may determine whether a hash of the block meets verification criteria, whether a nonce for the block meets defined criteria, or some may verify the block using some other similar information from the block. Further, the nodes may be required to form a majority before the block will be added. Thus, if five nodes were implementing the blockchain, then three of the five nodes may be required to verify the block before the block will be added to the blockchain. However, although this is one example of forming an agreement between nodes for a blockchain, it should be understood that other operations may be used to identify when a block is verified (e.g. identifying a quorum for the available nodes).

Figure 9:
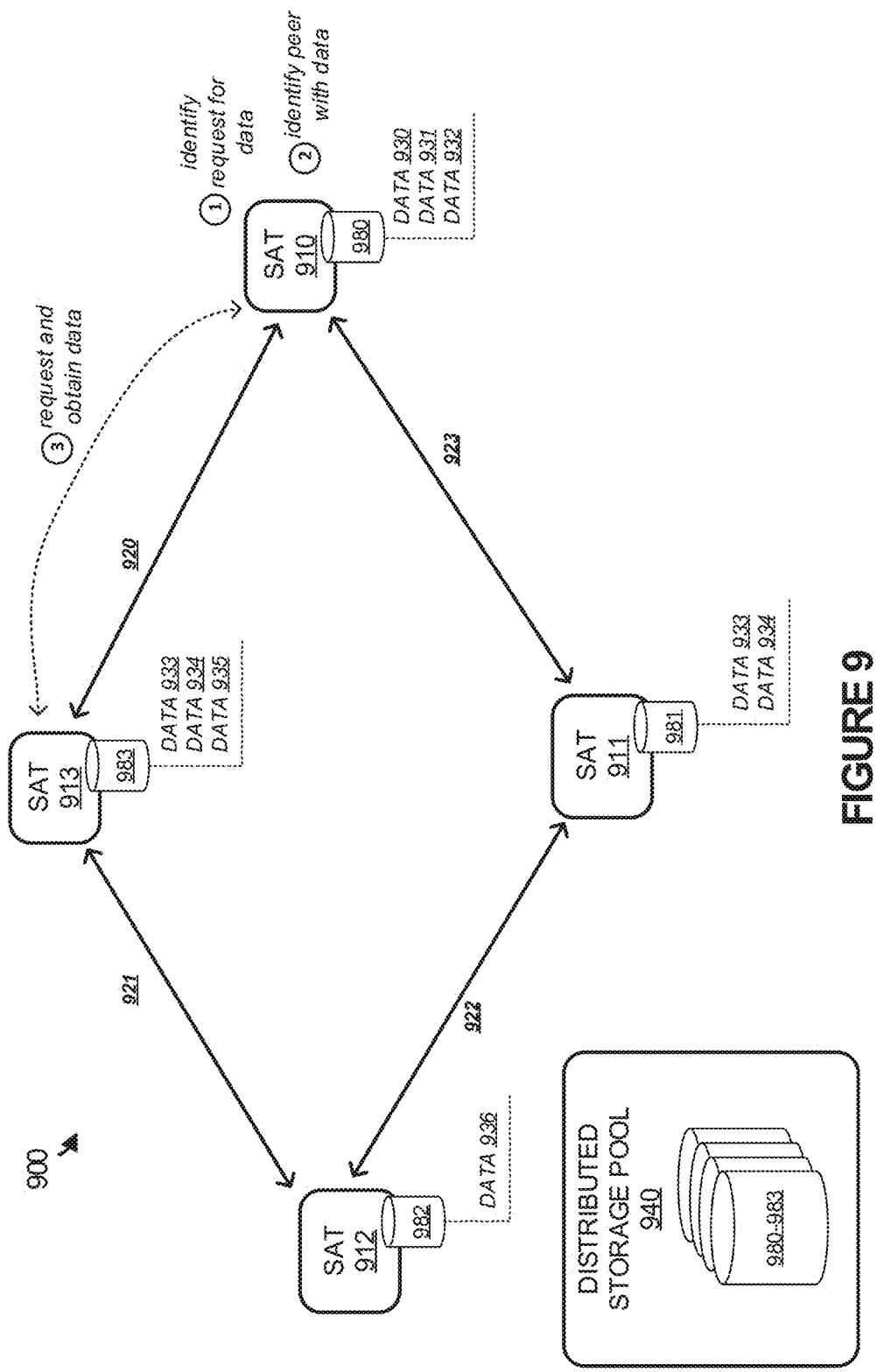
FIG. 9 illustrates an operational scenario of requesting a data object in a satellite storage pool according to an implementation.

FIG. 9 illustrates an operational scenario 900 of requesting a data object in a satellite storage pool according to an implementation. Operational scenario 900 includes satellites 910-913 that are communicatively coupled via communication links 920-923. Satellites 910-913 further include storage media capable of providing a distributed storage pool 940 for the satellite platform, and includes data 930-936. Although illustrated with four satellites in the present implementation, it should be understood that greater or fewer numbers of satellites may be deployed as part of a satellite platform.

As illustrated in the example of operational scenario 900, satellite 910 identifies, at step 1, a request for data from a process executing on the satellite. For example, an application that executes on one or more satellites in the satellite platform may provide image processing on images taken via sensors on the satellites. However, when the images are stored, the images may not necessarily be stored on the same satellite as the satellite providing the image processing operations. As a result, when the data request is identified, satellite 910 identifies, at step 2, a peer with the required data object. Returning to imaging example, a process on satellite 910 may request an image that was generated via another satellite and stored on that corresponding satellite. However, because the application may include a second process on a second satellite capable of providing operations on the image, the second satellite may identify a request for the object, and obtain, at step 3, the data object from the other satellite providing distributed storage pool 940. As an example, when the process on satellite 910 requests data object 935, satellite 910 identifies a corresponding satellite (or satellites) that store the object, and obtains the object from the identified satellite.

Although demonstrated in the example of FIG. 9 as receiving a data object from a single satellite, it should be understood that the data may be received from multiple satellite systems. For example, if data object 933 were requested, then the object may be received from multiple systems, wherein the systems may provide a peer to peer network to provide the required data for the object. In some implementations, in selecting the appropriate satellite to retrieve the object, satellite 910 may consider a variety of factors, including the latency of receiving the object from the satellite, the availability of the satellite, the throughput of the source satellite, or some other similar factor. Based on these factors, satellite 910 may select a particular satellite for the object, or may select multiple satellites to obtain the data, wherein multiple satellites may provide better throughput for the data object.

Figure 10:
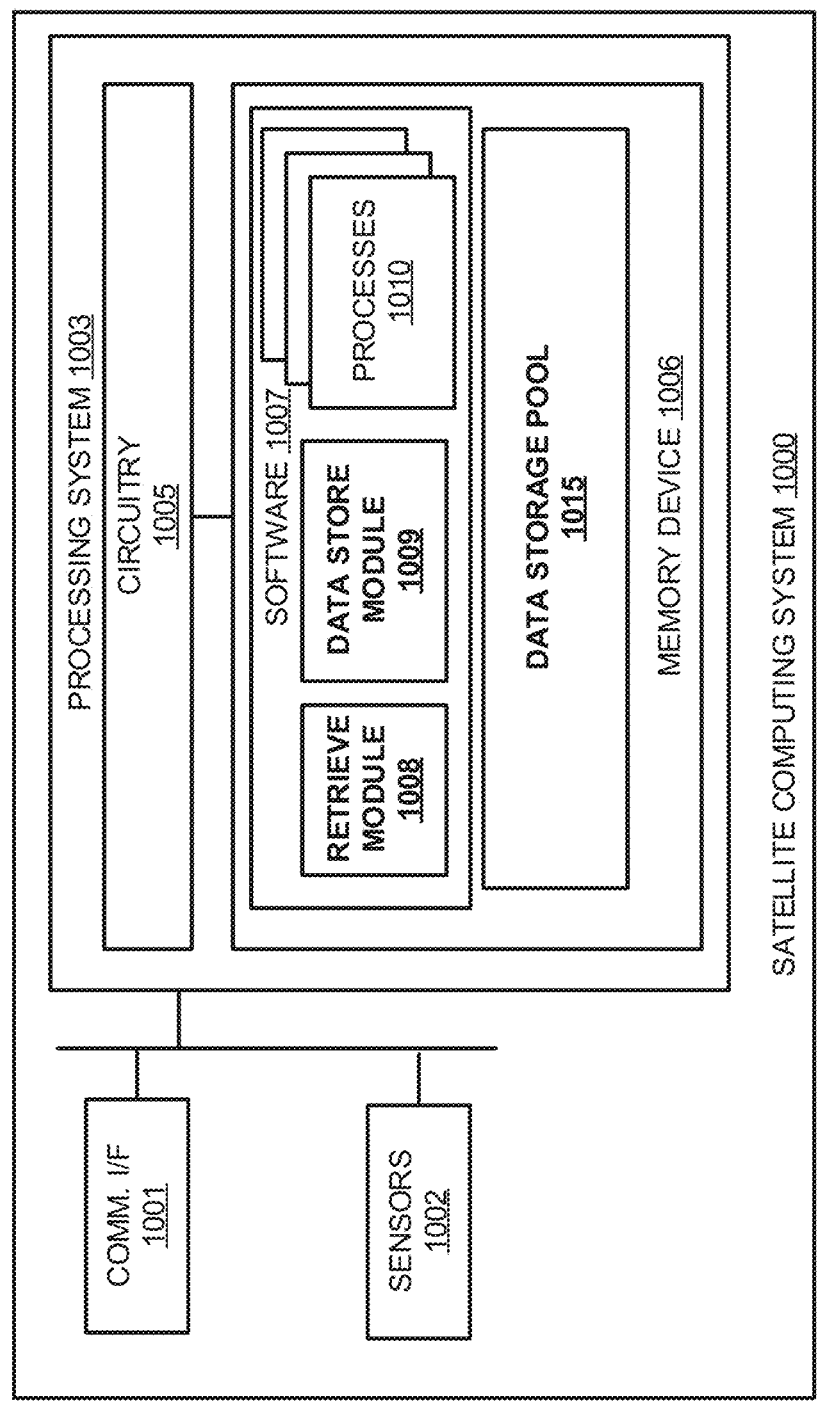
FIG. 10 illustrates a satellite computing system according to an implementation

FIG. 10 illustrates a satellite computing system 1000 according to an implementation. Computing system 1000 is representative of any computing system or systems with which the various operational architectures, processes, scenarios, and sequences disclosed herein for a satellite may be implemented. Computing system 1000 is an example of a satellite from FIGS. 1-7, although other examples may exist. Computing system 1000 comprises communication interface 1001, sensors 1002, and processing system 1003. Processing system 1003 is linked to communication interface 1001 and sensors 1002. Sensors 1002 may comprise imaging sensors, heat sensors, light sensors, or some other similar type of sensor. Processing system 1003 includes processing circuitry 1005 and memory device 1006 that stores operating software 1007. Computing system 1000 may include other well-known components such as a battery, solar panels, and enclosure that are not shown for clarity.

Communication interface 1001 comprises components that communicate over communication links, such as network cards, ports, radio frequency (RF), processing circuitry and software, or some other communication devices. Communication interface 1001 may be configured to communicate over wireless links. Communication interface 1001 may be configured to use Time Division Multiplex (TDM), Internet Protocol (IP), wireless protocols, communication signaling, or some other communication format—including combinations thereof. In some implementations, communication interface 1001 may communicate with one or more other satellites in a satellite platform and communicate with a ground control system.

Processing circuitry 1005 comprises microprocessor and other circuitry that retrieves and executes operating software 1007 from memory device 1006. Memory device 1006 may include volatile and nonvolatile, removable and non-removable media implemented in any method or technology for storage of information, such as computer readable instructions, data structures, program modules, or other data. Memory device 1006 may be implemented as a single storage device, but may also be implemented across multiple storage devices or sub-systems. Memory device 1006 may comprise additional elements, such as a controller to read operating software 1007. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 1005 is typically mounted on a circuit board that may also hold memory device 1006 and portions of communication interface 1001 and sensors 1002. Operating software 1007 comprises computer programs, firmware, or some other form of machine-readable program instructions. Operating software 1007 includes retrieve module 1008, data store module 1009, and processes 1010, although any number of software modules may provide the same operation. Operating software 1007 may further include utilities, drivers, network interfaces, applications, or some other type of software. When executed by processing circuitry 1005, operating software 1007 directs processing system 1003 to operate computing system 1000 as described herein.

In at least one implementation, processes 1010, when read and executed by processing system 1003, direct processing system 1003 to provide various operations as part of applications that may execute across multiple satellites in a satellite platform. These processes, which each may comprise a virtual node, may use sensors and the processing power of the satellite to provide various operations. In at least one implementation, as the processes are executing, the processes may generate a request to store a data object. Here, rather than storing all of the data locally at satellite computing system 1000, the data may be stored across multiple satellites that share a data storage pool of which data storage pool 1015 is part. In particular, the platform for processes 1010 may provide the processes with what appears to be a single storage volume although the data storage locations for the volume may be located on multiple computing systems. Consequently, when a request is generated by a process, data store module 1009 may identify at least one satellite of the satellite platform to store the data and communicate the data to the at least one satellite.

In some implementations, data may only be stored once on a single satellite, and data store module 1009 may consider a variety of factors on determining where the object should be stored. These factors may include latency in delivering the data to the destination satellite, throughput in providing the data to the destination satellite, the current geographic position of the satellite, the types of operations of the satellite, the physical proximity between the satellites, or any other similar information, including combinations thereof. As an example, if an image were required to be stored in the data storage pool, data store module 1009 may determine which of the satellites were configured for the image processing and/or the satellite that is best suited to provide the image processing based on the location of the satellites. Once determined, the data object may be provided to the destination satellite and stored in the corresponding storage media of the satellite. In some implementations, the various different processes executing on computing system 1000 may each be allocated their own data storage pool. These pools may be located on various subsets of the satellites, such that a first process may use a data storage pool on a first subset of satellites, while a second process (and corresponding application) may use a data storage pool on a second subset of satellites.

In some examples, rather than maintaining a single copy of a data object, the storage pool may be configured such that it provides redundancy for the data objects. Accordingly, rather than storing the data object on a single satellite, the data object and/or parity information for the data object may be supplied to multiple satellites to ensure high availability of the data object in case of failure of a satellite.

In addition to determining where data objects will be stored, retrieve module 1008 may also determine where to retrieve a data object. In particular, during the execution of processes 1010, a process may request a data object that is stored within the data storage pool. In response to the request, the module may determine at least one satellite that is hosting the storage of the data object, and obtain the data object from the at least one satellite. In determining the at least one satellite, retrieve module 1008 may determine at least one satellite that provides the lowest latency, highest bandwidth, is closest in proximity to the current satellite, and/or any other similar determination for retrieving the data object. In some implementations, in receiving the data object the data object may be received from a single source satellite. However, it should be understood that the object may be received from multiple satellites in some implementations to improve the latency in receiving the object.

In some examples, the data that is distributed between satellites, such as satellite computing system 1000, may comprise additional information than data gathered for processing by processes 1010. This additional information that may be stored in the storage pool may include state information related to the processes (virtual machines or containers) executing on the satellite, images of the virtual machines or containers themselves, or status information for any other process on the satellite (such as the host operating system and related support processes). In this manner, data may be located on a first satellite, but may be provided to one or more additional satellites for execution and processing. As a result, storage resources may be conserved as a single data object may be accessed by multiple satellites in the platform via inter-satellite communication.

In some implementations, rather than providing a single aggregated volume to virtual nodes operating as an application across multiple satellites, a storage pool may be used as a peer to peer network, wherein each of the satellites may maintain their own copy of the data. This is beneficial in operations, such as blockchains described in FIGS. 5 and 6, wherein each of the satellites (and their acting nodes) may be responsible for performing verifications of blocks and generating blocks from data ledgers. In this manner, rather than mounting a shared volume to each of the satellites, each of the satellites may manage their own storage to ensure high availability of data in a peer-to-peer network. This peer-to-peer network may also provide security in a blockchain implementation, wherein each of the satellites that act as a node for a particular application may be required to verify ledger entries and new block generated for the blockchain.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the disclosure. Those skilled in the art will also appreciate that the features described above can be combined in various ways to form multiple implementations. As a result, the invention is not limited to the specific implementations described above, but only by the claims and their equivalents.

What is claimed is:

1. A method of operating a satellite platform, the satellite platform comprising a plurality of satellites, the method comprising:

in a first satellite of the satellite platform, identifying a request for a ledger entry for a blockchain maintained by the satellite platform, wherein the ledger entry corresponds to data obtained from at least one sensor associated with the first satellite or data obtained from a communication interface of the first satellite configured to communicate with one or more other satellites or a ground control system, and wherein the ledger entry identifies a source satellite or ground control system for the ledger entry;

in the first satellite of the satellite platform and in response to the request, determining one or more shortest paths to distribute the ledger entry to one or more other satellites of the satellite platform, wherein the one or more other satellites comprise full nodes for the blockchain, and wherein at least one of the one or more shortest paths traverse at least one satellite of the satellite platform that does not maintain the blockchain;

in the first satellite of the satellite platform, distributing the ledger entry to one or more other satellites of the satellite platform using the one or more shortest paths; and in each of the one or more other satellites, determining when the ledger entry is verified and, when the ledger entry is verified, entering the ledger entry in a ledger for the satellite.

2. The method of claim 1, wherein the blockchain comprises an application blockchain implemented via a distributed application on two or more satellites.

3. The method of claim 2, wherein identifying the request for the ledger entry for the blockchain maintained by the satellite platform comprises identifying the request for the ledger entry for the blockchain in a process for the application on the first satellite.

4. The method of claim 1, wherein determining when the ledger entry is verified comprises determining whether the ledger entry is verified based on a signature for the ledger entry.

5. The method of claim 1 further comprising, in each of the one or more other satellites, when the ledger entry is not verified, preventing the ledger entry from being entered in the ledger.

6. The method of claim 1 further comprising, in a satellite of the one or more other satellites, generating a block for the blockchain via the ledger and distributing the block to other satellites that comprise full nodes for the blockchain.

7. The method of claim 1 further comprising, in the first satellite, entering the ledger entry in a ledger for the first satellite.

8. The method of claim 1 further comprising, in the first satellite, determining whether the ledger entry for the blockchain is valid based on a signature associated with the ledger entry, and wherein distributing the ledger entry to the one or more other satellites of the satellite platform comprises distributing the ledger entry to the one or more other satellites of the satellite platform when the ledger entry is valid.

9. A satellite platform comprising:

a plurality of satellites;

a first satellite in the plurality of satellites configured to:

identify a request for a ledger entry for a blockchain maintained by the satellite platform, wherein the ledger entry corresponds to data obtained from at least one sensor associated with the first satellite or data obtained from a communication interface of the first satellite configured to communicate with one or more other satellites or a ground control system, and wherein the ledger entry identifies a source satellite or ground control system for the ledger entry;

in response to the request, determine one or more shortest paths to distribute the ledger entry to one or more other satellites of the satellite platform, wherein the one or more other satellites comprise full nodes for the blockchain, and wherein at least one of the one or more shortest paths traverse at least one satellite of the satellite platform that does not maintain the blockchain;

distribute the ledger entry to the one or more other satellites of the satellite platform using the one or more shortest paths; and the one or more other satellites each configured to:
determine when the ledger entry is verified and, when the ledger entry is verified, enter the ledger entry in a ledger for the satellite.

10. The satellite platform of claim 9, wherein the blockchain comprises an application blockchain implemented via a distributed application on two or more satellites.

11. The satellite platform of claim 10, wherein identifying the request for the ledger entry for the blockchain maintained by the satellite platform comprises identifying the request for the ledger entry for the blockchain in a process for the application on the first satellite.

12. The satellite platform of claim 9, wherein determining whether the ledger entry is verified comprises determining whether the ledger entry is verified based on a signature for the ledger entry.

13. The satellite platform of claim 9, wherein each satellite of the one or more other satellites is further configured to, when the ledger entry is not verified, prevent the ledger entry from being entered in the ledger.

14. The satellite platform of claim 9, wherein a satellite of the one or more other satellites is further configured to generate a block for the blockchain via the ledger and distribute the block to other satellites that comprise full nodes for the blockchain.

15. The satellite platform of claim 9, wherein the first satellite is further configured to enter the ledger entry in a ledger for the first satellite.

16. A satellite comprising:
one or more non-transitory computer readable storage media;
a processing system operatively coupled to the one or more non-transitory computer readable storage media; and program instructions stored on the one or more non-transitory computer readable storage media that, when read and executed by the processing system, direct the processing system to at least:
obtain a ledger entry from another satellite in the satellite platform, wherein the ledger entry corresponds to a blockchain implemented by an application executing on the satellite and one or more other satellites, and wherein the ledger entry corresponds to data obtained from at least one sensor or data obtained from communication interface on the other satellite, and wherein the ledger entry identifies a source satellite or ground control system for the ledger entry;
determine whether the ledger entry is verified;
enter the ledger entry in a ledger for the distributed application on the satellite;
identify a second request for a second ledger entry for the blockchain;
in response to the second request, determine one or more shortest paths to distribute the ledger entry to the one or more other satellites, wherein at least one of the one or more shortest paths traverse at least one satellite in the satellite platform that does not implement the application; and
distribute the second ledger entry to the one or more other satellites.

17. The satellite of claim 16, wherein determining whether the ledger entry is verified comprises determining whether the ledger entry is verified based on a signature associated with the ledger entry.

* * * * *